United States Patent [19]
Corbin

[11] Patent Number: 5,877,608
[45] Date of Patent: Mar. 2, 1999

[54] CURRENT REGULATED MULTIPHASE MOTOR DRIVER WITH A COMMON CURRENT SENSE ELEMENT

[75] Inventor: Scott Alan Corbin, Stevens, Pa.

[73] Assignee: Philips Electronics North America Corporation, New York, N.Y.

[21] Appl. No.: 976,525

[22] Filed: Nov. 21, 1997

[51] Int. Cl.$^6$ ..................................... H02P 5/28
[52] U.S. Cl. .......................... 318/810; 318/685; 318/696; 318/798
[58] Field of Search ...................... 318/685, 810, 318/811, 696, 599, 254, 113, 138; 346/439, 17; 368/204

[56] References Cited

U.S. PATENT DOCUMENTS

| | | | |
|---|---|---|---|
| 4,315,268 | 2/1982 | Tazaki | 346/17 |
| 4,433,401 | 2/1984 | Shida et al. | 368/204 |
| 4,495,455 | 1/1985 | Araki | 318/696 |
| 4,825,133 | 4/1989 | Tanuma et al. | 318/113 |
| 4,918,365 | 4/1990 | Tanuma et al. | 318/365 |

OTHER PUBLICATIONS

"Stepper Motor Basics", Industrial Circuits Data Book and Stepper Motor Control Handbook, Erricsson Components AB 1995, Publication No. IC2 (95015)A–Ue, Ericsson Components AB, S–164 81 Kista–Stockholm, Sweden.

"Drive Circuit Basics"Industrial Circuits Data Book and Stepper Motor Control Handbook, Erricsson Components AB 1995, Publication No. IC2 (95015)A–Ue, Ericsson Components AB, S–164 81 Kista–Stockholm, Sweden.

"Synchronization of Single–channel Stepper Motor Drivers Reduces Noise and Interference" Industrial Circuits Data Book and Stepper Motor Handbook, Erricsson Components AB 1995, Publication No. IC2 (95015)A–Ue, Ericsson Components AB, S–164 81 Kista–Stockholm, Sweden.

Primary Examiner—William M. Shoop, Jr.
Assistant Examiner—Rita Leykin
Attorney, Agent, or Firm—Bernard Franzblau

[57] ABSTRACT

In a multiphase motor driver, each phase current is controlled by the ratio of measurements across a common sense element. By utilizing the same sense element for each phase, inaccuracies which result from the variance among multiple sense elements can be eliminated. The individual phase currents are controlled from a common clock generation device. By appropriately controlling each of the phase currents to assure that only one of the phase currents is flowing through the sense element at the time of measurement, the measurement is assured to be dependent on the individual current and the parametric value of the sense element only. Thereby, the control of the phase currents, via the ratio of the measured values across the common sense element, is independent of the parametric value of this common sense element.

20 Claims, 3 Drawing Sheets

CURRENT REGULATED MULTIPHASE MOTOR DRIVER WITH A COMMON CURRENT SENSE ELEMENT

BACKGROUND OF THE INVENTION

1. Field of the Invention

This invention relates to a controller for a multiphase motor, and in particular a controller for a multiphase stepper motor. Such motors are typically used for precise and repeatable angular rotations, for example, accurate machine positioning. Controlled angular positioning is accomplished by suitably adjusting the ratio of currents supplied to each phase winding of the motor.

2. Description of the Related Art

Multiphase motors are commonly used to precisely adjust the angular rotation of the motor shaft by applying appropriate currents to windings in the motor which have a fixed phase relation to each other. For example, a two phase motor may be constructed with two sets of windings about poles which are orthogonal to each other. Applying current to one set will force the poles on the motor shaft to align with the activated poles; subsequently switching the current to the other set will force the poles to align with this second set of poles, thereby forcing a 90 degree rotation of the shaft. Removing the current from the second set and applying an opposite current to the first set will force another 90 degree rotation, and so on. Each winding set is referred to as a phase winding, or merely a phase, of the motor. Each phase may comprise multiple poles within the motor, such that the rotation from one set of poles to another, the step angle, is a submultiple of the entire 360 degree rotation. For example, an eight pole motor has a step angle of 45 degrees, while a 16 pole motor has a step angle of 22.5 degrees. Traditionally, multiphase motors are designed to have two or three phases, although five phase motors are not uncommon. For ease of understanding, unless otherwise noted, a two phase motor will be assumed, but the principles of this invention are not intended to be limited to a two phase motor, as will be evident to one skilled in the art. Also, for ease of understanding, because stepper motors are the most common form of multiphase motors, the stepper motor will be presented for illustrative purposes herein, although the principles contained herein are applicable to alternative multiphase motors such as D.C. servo motors, A.C. synchronous motors, and the like.

Applying current to both phase windings of a two phase stepper motor will force the shaft to be located somewhere between the winding poles; for example, applying equal current to each winding pole in the above orthogonal pole example will result in a 45 degree rotation, as the shaft poles are equally attracted to each of the orthogonal poles. A microstepping motor allows for continuously variable currents to be applied to each winding set, thereby allowing the shaft to be rotated to the desired angular position between the fixed winding poles.

The ratio of the currents applied to each phase winding will determine the amount of rotation within a given step size. As noted above, applying equal currents will result in the location of the shaft to be the midpoint between the poles. To effect the control of the current which is applied to a motor winding, a motor driver as shown in FIG. 1 may be utilized. In FIG. 1a, a motor driver 20 comprises an oscillator 120, a flip-flop 130, a voltage comparator 140, and a switch S1. The oscillator 120 is connected to a timing circuit TOSC, which is used to set the nominal frequency of the oscillator 120, so as to periodically set the flip-flop 130. The output 131 of the flip-flop 130 controls the switch S1. A motor M, having a winding 100, is connected in series between a voltage source 101 and the switch S1. A resistor $R_S$ 110 is connected in series between common ground and the switch S1. When the flip-flop is set, the switch S1 connects the motor M to the resistor $R_S$, thereby allowing current to flow from the voltage source 101, through the motor M and resistor $R_S$, to ground. When the flip-flop is reset, the switch S1 is opened, and current no longer flows through $R_S$ to ground. Being an inductive device, the current in the motor M cannot instantaneously go to zero; not shown are components which allow for inductive current to continue to flow/decay after switching, well known to those skilled in the art. For ease of understanding, unless otherwise noted, the currents referred to herein are the currents directly related to the supply source 101, and not those associated with residual, inductive currents.

The voltage across the resistor $R_S$ will be directly proportional to the current supplied to the motor M from voltage source 101, heretofore referred to as the winding current. The comparator 140 compares this voltage 111 to a control voltage VC. When the voltage 111 across the resistor $R_S$ equals the control voltage VC, the flip-flop 130 is reset, terminating the current flow. Optionally, the flip-flop 130 may also be fed back to the oscillator 120, to initiate an "off" time period; alternatively, the oscillator could be free running at a nominal frequency determined by TOSC. After a time period, determined by TOSC, the oscillator output 121 changes state and sets flip-flop 130, which closes switch S1, thereby providing current to the motor M again. Thus, by controlling the voltage VC, the current flow to the motor can be controlled.

Shown in FIG. 1b is a motor driver 10 having a second switch S2 to set the polarity of the current flowing through the motor M. Via signal P, the current to the winding can flow in either direction. Because stepper motors typically require polarity reversals, the circuit 10 shown in FIG. 1b is the more commonly used circuit for motor drivers.

Shown in FIG. 2 is the use of a pair of motor drivers 10a and 10b for a two phase stepper motor M comprising windings $W_A$ and $W_B$. A controller 250 determines the polarity and magnitude of the current to be applied to each phase winding. The voltage level VC corresponding to the desired current magnitude is also determined, being the product of the desired current magnitude and the value of the current sensing resistor $R_S$. The controller provides the input to each motor driver 10a and 10b as Pa, $VC_A$ and Pb, $VC_B$, respectively. Each motor driver supplies the current to the winding by connecting each winding to ground, via resistors $R_{SA}$ and $R_{SB}$, as discussed above, until the voltage across each resistor $R_{SA}$ and $R_{SB}$ equals $VC_A$ and $VC_B$, respectively.

If both drivers operate independently, both windings may be switched on at the same time, and the source must be designed to accommodate supplying the cumulative current. If, on the other hand, the drivers are synchronized, such that they each supply current to their associated winding sequentially, the supply need only be designed to supply the maximum current required of each, rather than the cumulative current. Shown in FIG. 2 is a conventional means for synchronizing the operation of drivers 10a and 10b. An edge detector 210 determines when current is switched from winding $W_A$. At this time of switching, the timing circuit $T_B$ which controls motor driver 10b is forced to a reset value by diode 220. By forcing a reset of the timing circuit $T_B$ at the time that current is switched from winding $W_A$, current flows to winding $W_A$ after flowing in winding $W_A$, in a sequential manner. Note that this synchronization requires sufficient current flowing to winding $W_A$ such that the edge detector 210 can detect the cessation of current. If the current flowing to winding $W_A$ is so slight as to preclude edge detection, both drivers will operate asynchronously. Because the intent of this synchronization is to preclude excessive supply current, an overlap of currents when the current flowing to winding $W_A$ is slight is not considered a problem.

The conventional synchronous motor control discussed above will be designed such that the sum of the on-times of both the windings is less than or equal to the overall cycle time. In this way, a long duration on-time to one winding will be offset by the corresponding short duration on-time of the other winding. Note that in the conventional synchronous motor control of FIG. 2, if the on-time of motor driver 10b is greater than the off-time of motor driver 10a, current will flow in both windings $W_A$ and $W_B$ simultaneously. Because it is assumed that this potential overlap period is slight, and that during this potential overlap period, the current in winding $W_A$ will be slight, this potential simultaneous current flow is not considered a problem.

As discussed above, the controller 250 sets the control voltages $VC_A$ and $VC_B$ as required so as to produce the appropriate currents in windings $W_A$ and $W_B$. The association of these control voltages to the desired current is directly proportional to the value of the sensing resistors $R_{SA}$ and $R_{SB}$. In determining the control voltages, the controller must use the nominal resistance values of the resistors; any inaccuracy in the resistor values will be reflected as an inaccuracy in the duration that the source current is applied, with a resultant inaccuracy in the position of the motor shaft. For this reason, the sense resistors used for motor drivers in high precision applications are typically specified with very tight tolerances, typically 1% or less. Often, pairs of resistors are hand sorted to provide for closely matched pairs. Note also that all of the motor current flows through the sense resistor, and therefore the sense resistors are also specified to be capable of handling high current flow. High power, tight tolerance resistors are costly, and subject to high thermal stress. Over time, the resistance values may change, and inaccuracies can be introduced; highly precise motor controllers often require initial calibration and subsequent recalibrations to minimize the inaccuracies associated with the sensing resistors.

SUMMARY OF THE INVENTION

It is the object of this invention to minimize the inaccuracies in multiphase motor positioning caused by the inaccuracies associated with the current sensing resistors used for multiphase motor control.

By controlling the timing of each of the motor drivers by a common timing control, with cycle times independent of the current flow in either of the windings, it can be assured that the flip-flops 130 within each of the motor drivers are controlled so as to be out of phase with each other. In so doing, one sensing resistor can be connected in common to the sense input, with the assurance that the outputs of the comparator 140 within each motor driver has no effect on the state of the flip-flop 130 when the alternate motor driver is selected. That is, the common sense element will reflect the current flowing within each of the windings, but the timing circuitry is arranged so as to preclude current flowing in both windings at any time, and to sensitize the current switching flip-flop only when the corresponding winding current is flowing through the common resistor.

Because the same sense element is utilized to sense the current in each phase, and the rotational position of the motor shaft is determined by the ratio of the currents, any inaccuracies in the nominal resistance value of the sense element will be eliminated. In effect, the rotational position will be completely independent of the resistance of the sense element. Variations in the resistance over time will not affect the rotational accuracy, and the need for calibration or recalibrations will be minimized.

DESCRIPTION OF THE PREFERRED EMBODIMENTS

Figure 3:
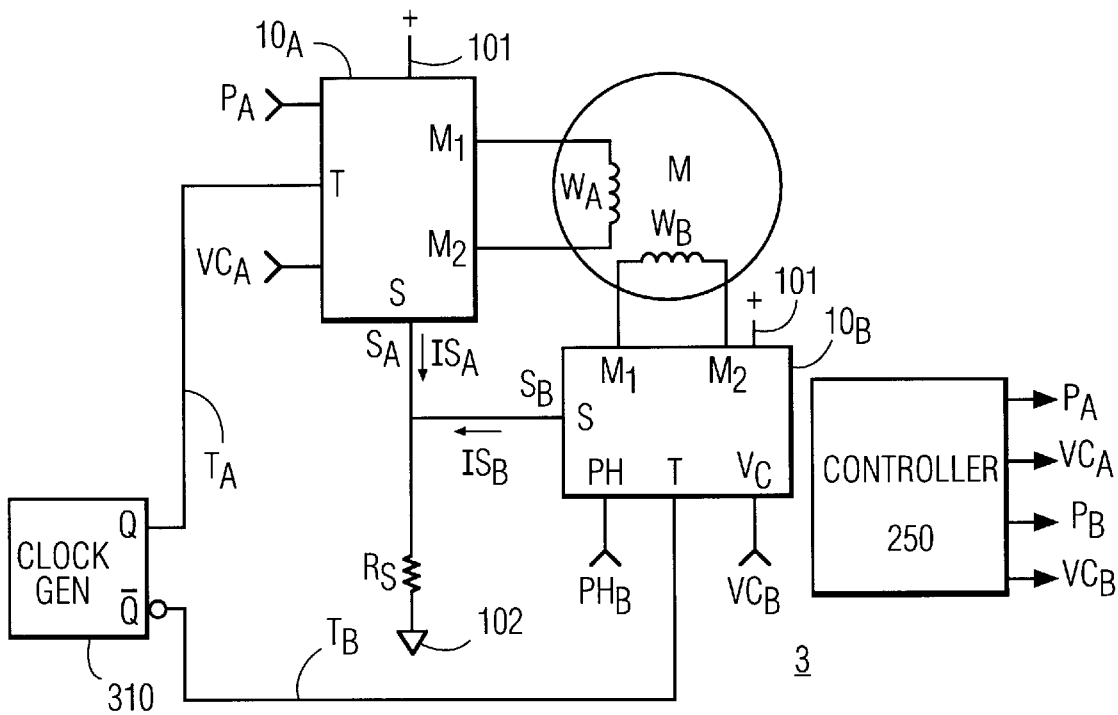
FIG. 3 shows a two phase synchronous multiphase motor with microstep control in accordance with this invention.
Figure 4A:
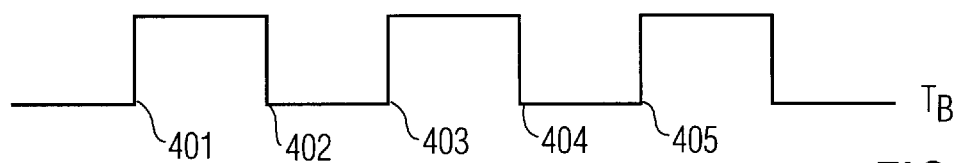
FIG. 4 shows a timing diagram for a two phase synchronous multiphase motor with microstep control in accordance with this invention.
Figure 4B:
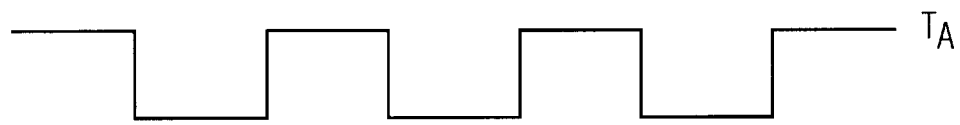
Figure 4C:
Figure 4D:
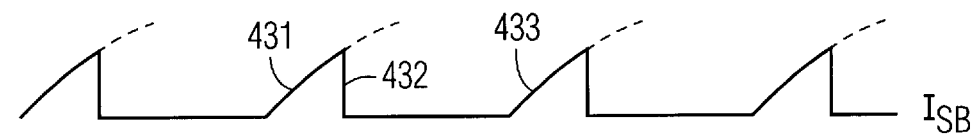
Figure 4E:
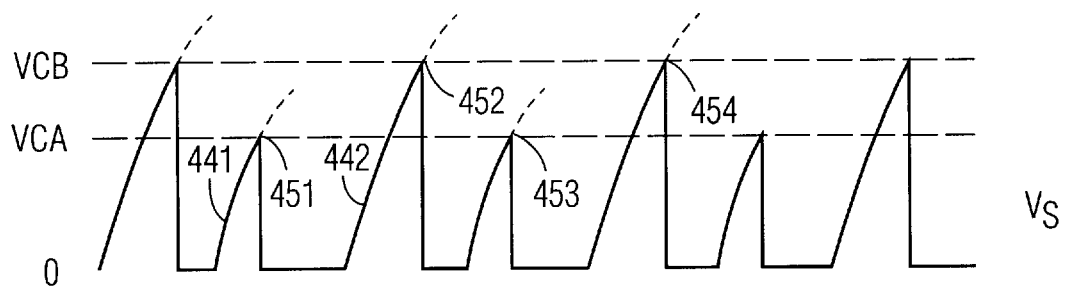
Figure 4F:
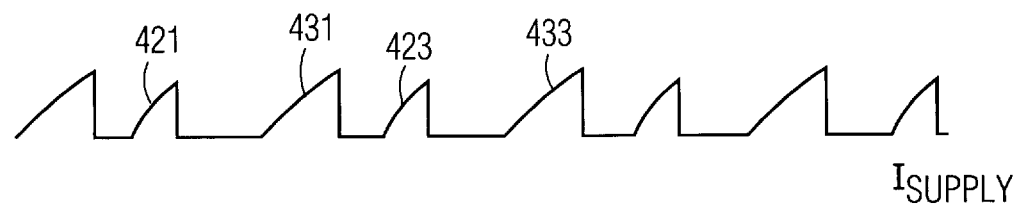

FIG. 3 shows a two phase synchronous stepper motor with microstep control in accordance with this invention, and FIG. 4 shows the timing diagram associated with the operation of this motor control. The controller 250, as discussed above, provides the control signals (Pa, $VC_A$ and (Pb, $VC_B$)) to the motor controllers 10a and 10b, respectively. The polarity inputs, Pa and Pb, control the polarity, and the control voltages $VC_A$ and $VC_B$ control the magnitudes, of the currents applied to motor M windings $W_A$ and $W_B$, respectively. Clock generator 310 produces a periodic clocking signal $T_A$, and an inverted clocking signal $T_B$. Signals $T_A$ and $T_B$ are shown in FIG. 4. If a three phase motor is utilized, the clock generator would produce three timing signals, each having mutually exclusive phases.

Figure 1A:
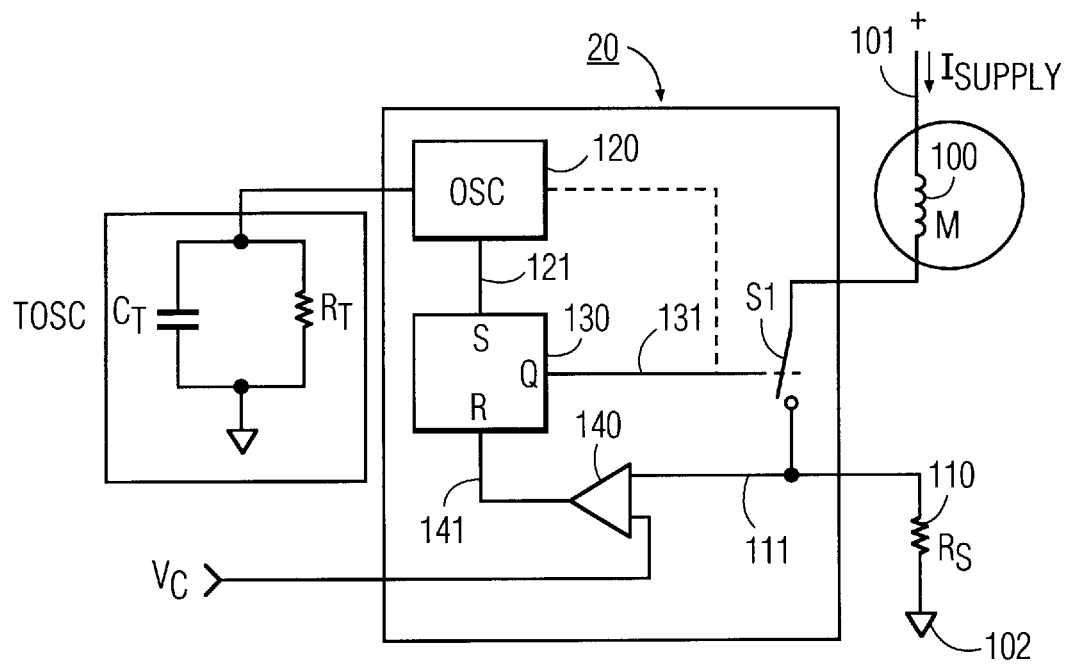
FIG. 1 shows a prior art multiphase motor current control.
Figure 1B:
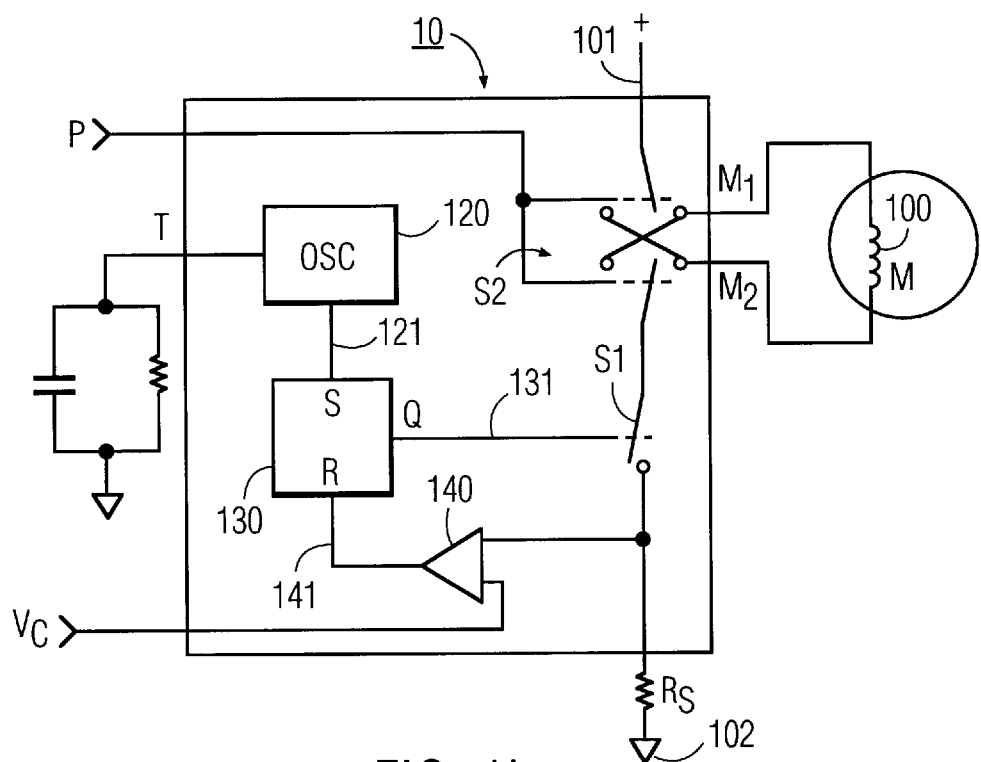

The motor drivers 10a and 10b are each a motor driver 10 as shown in FIG. 1b. When the T input of motor driver 10 switches from high to low, the oscillator 120 sets the flip-flop 130. When the flip-flop output 131 is high, the switch S1 is closed. When the voltage at the sense input S exceeds the control voltage input VC, the comparator 140 resets the flip-flop 130, which causes switch S1 to open.

Consider an initial state wherein no current is flowing through either of the windings $W_A$ or $W_B$ in FIG. 3. With no current flowing, the voltage at either sense output $S_A$, $S_B$ of motor drivers 10a and 10b will be zero, and each of the voltage comparators 140 in the motor drivers will reset the flip-flops in each, opening the switch S1, thereby precluding current flow through either winding. At time 401, the signal $T_A$ goes low and the switch S1 within motor driver 10a closes, as detailed above, connecting the winding $W_A$ to the sense terminal $S_A$. Current flows from the supply 101 through winding $W_A$ and through the sense resistor $R_S$ to common ground 102. The current from the sense terminal $S_A$ of motor driver 10a is designated $IS_A$. The current from the sense terminal $S_B$ of motor driver 10b is designated $IS_B$. Because signal $T_B$ has not yet gone from a high to low state, the switch S1 within motor driver 10b remains open, and current $IS_B$ is zero. Therefore, the current which flows through sense resistor $R_S$ will be $IS_A$, exclusively. While the switch S1 in motor driver 10a is closed, the current $IS_A$ increases, as shown in FIG. 4 at 421. This current results in a voltage VS being produced across the sensing resistor $R_S$, equal to $IS_A * R_S$, shown in FIG. 4 at 441. When this voltage VS exceeds the control voltage $VC_A$ at time 451, the voltage comparator 140 within motor driver 10a will reset the flip-flop 130 and open the switch S1 within motor driver 10$a$, which will cause the current $IS_A$ to cease, as shown at 422 in FIG. 4. The flip-flop 130, having been reset, will not set again until the trigger to the oscillator 120 again switches from high to low.

At time 402, the clocking signal $T_B$ switches from high to low, triggering the oscillator 120 within motor driver 10$b$, causing its flip-flop to be set, closing switch S1, thereby connecting winding $W_B$ to the sense terminal $S_B$. When the switch S1 within motor driver 10$b$ is closed, current $IS_B$ flows through the winding $W_B$ and the sense resistor $R_S$. Because current $IS_A$ cannot flow until timing signal $T_A$ again switches from high to low, as discussed above, the current flowing through $R_S$ is the current $IS_B$, exclusively, and the voltage VS across $R_S$ is equal to $IS_B*R_S$. When this voltage is greater than $VC_B$, at 452 in FIG. 4, the comparator 140 within motor driver 10$b$ resets the flip-flop, opening the switch S1 within motor driver 10$b$. When the switch S1 within the motor driver 10$b$ opens, current $IS_B$ ceases, as shown at 432 in FIG. 4. The current $IS_B$ will not flow again until the clocking signal $T_B$ again switches from high to low.

At time 403, the clocking signal $T_A$ switches from high to low, triggering the oscillator 120, setting the flip-flop 130, and closing the switch S1 within motor driver 10$a$, thereby allowing current $IS_A$ to flow again. The current $IS_A$ will increase as shown at 423, until VS again exceeds $VC_A$ at 453 in FIG. 4. At time 404, the clocking signal $T_B$ switches from high to low, and current $IS_B$ again flows 433 until the voltage VS again exceeds $VC_B$, at 454. These cycles repeat with each cycle of timing signal $T_A$, alternately allowing current to flow in windings $W_A$ and $W_B$ periodically and non-coincident with each other.

As shown in FIG. 4, the current Isupply from the supply 101 comprises the non-zero segments 421, 431, 423, 433, etc. of currents $IS_A$ and $IS_B$. The control voltages $VC_A$ and $VC_B$ from the controller 250 are limited so as to assure that the voltage VS across $R_S$ will always exceed $VC_A$ or $VC_B$ within one half cycle of the timing signals $T_A$, $T_B$.

The circuit of FIG. 3 and the timing relationships shown in FIG. 4 are shown for the embodiment of this invention wherein a conventional motor driver 10 is used to control the current to each winding. As would be evident to one skilled in the art, alternative arrangements would be consistent with the spirit and intent of this invention. For example, if the clock generator 310 produced short duration pulses on lines $T_A$ and $T_B$, the oscillator 120 can be eliminated by having these short duration pulses directly set the flip-flops 130.

As presented, the control voltages $VC_A$ and $VC_B$ must be limited such that the winding current will rise to a level which will cause the comparator 140 to reset the flip-flop within each driver's half cycle. Alternatively, to prevent current from flowing beyond the driver's half-cycle duration, the switching of the clocking signal T from low to high could be used to force each half-cycle reset.

Note that the solution presented thus far limits the on-time of either winding to half the cycle time of the common controller, whereas as discussed above, the conventional synchronous motor control is typically designed such that the sum of the on-times of both the windings is less than or equal to the overall cycle time. As would be evident to one skilled in the art, the clock generator 310 can be coupled to the controller 250, so as to produce an asymmetric cycle, wherein the duration of the sensing phase of timing signal $T_A$ is adjusted in dependence upon the desired current in winding $W_A$, and the non-sensing phase is adjusted in dependence upon the desired current in winding $W_B$. In this manner, the invention presented herein can provide for the same level of efficiency as the conventional synchronous motor controller, yet achieve significantly higher positional accuracies, as discussed below.

Figure 2:
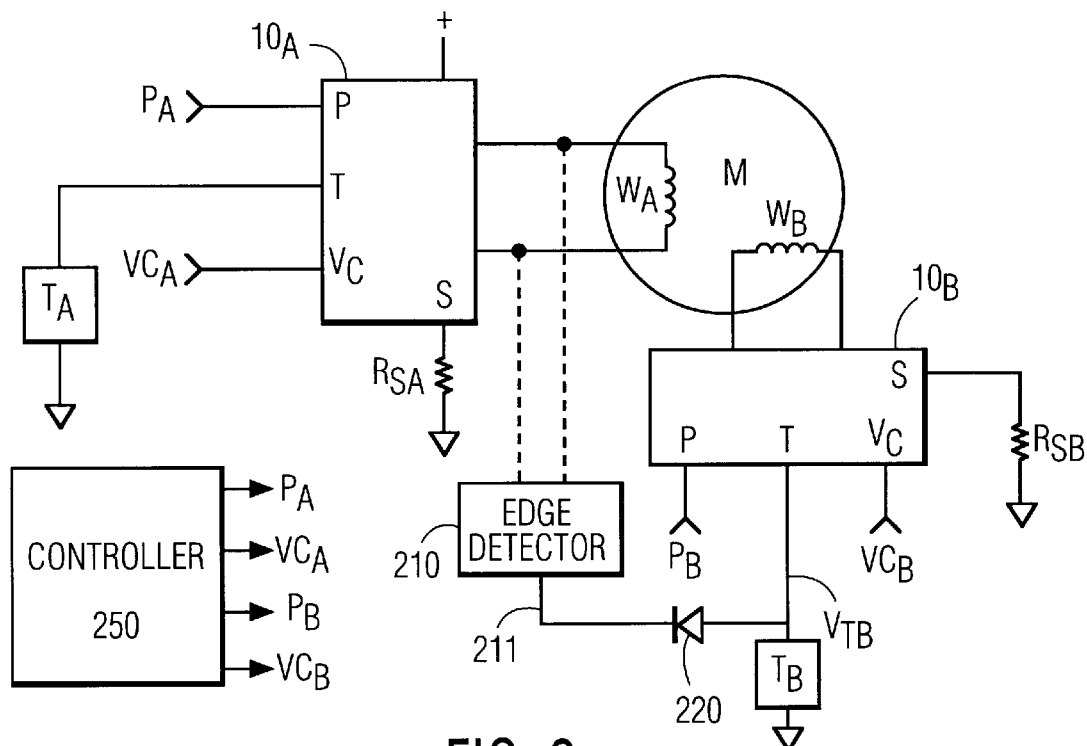
FIG. 2 shows a prior art two phase synchronous multiphase motor with microstep control.

The positioning of a stepper motor is determined by the ratio of currents flowing through the windings. The control voltages are determined so as to produce the appropriate ratio. In a conventional system, as shown in FIG. 2, it can be seen that $VC_A$ and $VC_B$ will be determined as follows:

$VC_A = I_A*R_{SA}$, and $VC_B = I_B*R_{SB}$ where $R_{SA}$ and $R_{SB}$ represent the nominal resistance values of these elements. Let $R_{SA}'$ and $R_{SB}'$ represent the actual resistance values of sense elements $R_{SA}$ and $R_{SB}$ respectively. Let $I_A'$ and $I_B'$ represent the actual current which flows through the windings $W_A$ and $W_B$, respectively. The comparator 140 will reset the flip-flop 130 in each of the motor drivers of FIG. 2 when the actual sense voltages Va' and Vb' equal $VC_A$ and $VC_B$, respectively:

$VC_A = Va' = I_A'*R_{SA}'$, and $VC_B = Vb' = I_B'*R_{SB}'$, or, $I_A' = VC_A/R_{SA}'$, and $I_B' = VC_B/R_{SB}'$, $I_A' = I_A*R_{SA}/R_{SA}'$, and $I_B' = I_B*R_{SB}/R_{SB}'$ With regard to the actual current ratio produced:

$I_A'/I_B' = I_A/I_B*(R_{SA}*R_{SB}')/(R_{SA}'*R_{SB})$.

Thus it is seen that, in the conventional motor control system, the actual current ratio will differ from the desired current ratio by a factor of $R_{SA}*R_{SB}'/R_{SA}'*R_{SB}$. This factor is the error factor introduced by any deviations in the sense elements $R_{SA}$, $R_{SB}$ used to control the motor drivers.

Note that, in accordance with this invention, the sense voltage VS for each phase of the stepper motor is directly proportional to the same sense resistance $R_S$, and each driver controls the current in dependence upon this sense voltage as compared to the respective control voltages $VC_A$ and $VC_B$. Thus, in accordance with this invention, the control voltages of FIG. 3 will be determined as:

$VC_A = I_A*R_S$, and $VC_B = I_B*R_S$.

As above, assume that the actual value of the sense resistor $R_S$ is $R_S'$. Let $I_A'$ and $I_B'$ represent the actual currents through the windings $W_A$ and $W_B$ when the resistor $R_S$ has an actual value of $R_S'$. The comparator 140 will reset the flip-flop 130 in each of the motor drivers of FIG. 3 when the actual sense voltages VS' equals $VC_A$ and $VC_B$, respectively, during each half cycle of timing signal $T_A$:

$VC_A = VS'$(when $T_A$ is Low)$=I_A'*R_S'$, and $VC_B = VS'$(when $T_A$ is High)$=I_B'*R_S'$, or, $I_A' = VC_A/R_S'$, and $I_B' = VC_B/R_S'$, $I_A' = I_A*R_S/R_S'$, and $I_B' = I_B*R_S/R_S'$.

With regard to the actual current ratio produced:

$I_A'/I_B' = I_A/I_B*(R_S*R_S')/(R_S'*R_S) = I_A/I_B$.

Thus it is seen that $I_A'/I_B'$, the actual current ratio, is equal to $I_A/I_B$, the desired current ratio, independent of the nominal or actual value of the resistance element used as the sense resistor. Because it is the ratio of currents which determine the accuracy, it is thus seen that, in accordance with this invention, the accuracy is independent of the nominal or actual value of the resistance element used as the sense resistor.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A multiphase motor system, comprising:

a motor having a first phase winding, and a second phase winding, a controller for providing a first control voltage and a second control voltage, a first motor driver for supplying a first current to said first phase winding, a second motor driver for supplying a second current to said second phase winding, said first motor driver supplying said first current in response to a first timing signal, and terminating said first current when a first sense voltage exceeds the first control voltage, said second motor driver supplying said second current in response to a second timing signal, and terminating said second current when a second sense voltage exceeds the second control voltage, characterized in that:

the system further comprises a clock generator for supplying the first timing signal and the second timing signal, said first and second timing signals being out of phase with each other, and a sense element connected in common to said first and second motor drivers such that:

when the first motor driver supplies the first current to the first phase winding, said first current induces the first sense voltage across said sense element, and when the second motor driver supplies the second current to the second phase winding, said second current induces the second sense voltage across said sense element.

2. A multiphase motor system as claimed in claim 1, wherein said motor also has a third phase winding, said controller also provides a third control voltage, said clock generator also supplies a third timing signal which is out of phase with each of said first and second timing signals said system further comprising:

a third motor driver for supplying a third current to said third phase winding, said third motor driver supplying said third current in response to the third timing signal, and terminating said third current when a third sense voltage exceeds the third control voltage, characterized in that:

said sense element is also connected in common to said third motor driver such that when the third motor driver supplies the third current to the third phase winding, said third current induces the third sense voltage across said sense element.

3. A multiphase motor control system as claimed in claim 1, wherein each of said motor drivers comprise:

a trigger circuit for producing a trigger output in dependence upon the timing signal, a voltage comparator for comparing the sense voltage to the control voltage and producing a compare output, a switch for supplying the current to the phase winding, and a logic device to control the switch in dependence upon said trigger output and said compare output.

4. A multiphase motor control system as claimed in claim 1, wherein said sense element is a resistor.

5. A multiphase motor control system as claimed in claim 2, wherein said sense element is a resistor.

6. A multiphase motor control system as claimed in claim 3, wherein said sense element is a resistor.

7. A multiphase motor control system as claimed in claim 1, wherein one or more of said timing signals are supplied by the clock generator in dependence upon one or more of said control voltages.

8. A multiphase motor control system as claimed in claim 2, wherein one or more of said timing signals are supplied by the clock generator in dependence upon one or more of said control voltages.

9. A multiphase motor control system as claimed in claim 3, wherein one or more of said timing signals are supplied by the clock generator in dependence upon one or more of said control voltages.

10. A multiphase motor control system as claimed in claim 4, wherein one or more of said timing signals are supplied by the clock generator in dependence upon one or more of said control voltages.

11. A multiphase motor control system for controlling a motor having a first phase winding, and a second phase winding, said control system comprising:

a controller for providing a first control voltage and a second control voltage, a first motor driver for supplying a first current to said first phase winding, a second motor driver for supplying a second current to said second phase winding, said first motor driver supplying said first current in response to a first timing signal, and terminating said first current when a first sense voltage exceeds the first control voltage, said second motor driver supplying said second current in response to a second timing signal, and terminating said second current when a second sense voltage exceeds the second control voltage, characterized in that:

the system further comprises a clock generator for supplying the first timing signal and the second timing signal, said first and second timing signals being out of phase with each other, and a sense element connected in common to said first and second motor drivers such that:

when the first motor driver supplies the first current to the first phase winding, said first current induces the first sense voltage across said sense element, and when the second motor driver supplies the second current to the second phase winding, said second current induces the second sense voltage across said sense element.

12. A multiphase motor control system as claimed in claim 11, wherein said motor also has a third phase winding, and said controller also provides a third control voltage, said clock generator also supplies a third timing signal which is out of phase with each of said first and second timing signals said control system further comprising:

a third motor driver for supplying a third current to said third phase winding, said third motor driver supplying said third current in response to the third timing signal, and terminating said third current when a third sense voltage exceeds the third control voltage, characterized in that:

said sense element is also connected in common to said third motor driver such that when the third motor driver supplies the third current to the third phase winding, said third current induces the third sense voltage across said sense element.

13. A multiphase motor control system as claimed in claim 11, wherein each of said motor drivers comprise:

a trigger circuit for producing a trigger output in dependence upon the timing signal, a voltage comparator for comparing the sense voltage to the control voltage and producing a compare output, a switch for supplying the current to the phase winding, and a logic device to control the switch in dependence upon said trigger output and said compare output.

14. A multiphase motor control system as claimed in claim 11, wherein said sense element is a resistor.

15. A multiphase motor control system as claimed in claim 12, wherein said sense element is a resistor.

16. A multiphase motor control system as claimed in claim 13, wherein said sense element is a resistor.

17. A multiphase motor control system as claimed in claim 11, wherein one or more of said timing signals are supplied by the clock generator in dependence upon one or more of said control voltages.

18. A multiphase motor control system as claimed in claim 12, wherein one or more of said timing signals are supplied by the clock generator in dependence upon one or more of said control voltages.

19. A multiphase motor control system as claimed in claim 13, wherein one or more of said timing signals are supplied by the clock generator in dependence upon one or more of said control voltages.

20. A multiphase motor control system as claimed in claim 14, wherein one or more of said timing signals are supplied by the clock generator in dependence upon one or more of said control voltages.

* * * * *